(12) United States Patent
Franklin et al.

(10) Patent No.: US 8,773,097 B2
(45) Date of Patent: Jul. 8, 2014

(54) DIGITAL PEAK CURRENT MODE CONTROL FOR SWITCH-MODE POWER CONVERTERS

(75) Inventors: Chris Michael Franklin, Austin, TX (US); Brent Alan McDonald, Murphy, TX (US); John Christian Vogt, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 307 days.

(21) Appl. No.: 12/985,693

(22) Filed: Jan. 6, 2011

(65) Prior Publication Data

US 2012/0176824 A1 Jul. 12, 2012

(51) Int. Cl.
*H02M 3/157* (2006.01)

(52) U.S. Cl.
USPC .......................... 323/283; 323/285

(58) Field of Classification Search
USPC .................. 323/282, 283, 284, 285
See application file for complete search history.

(56) References Cited

U.S. PATENT DOCUMENTS

| | | | |
|---|---|---|---|
| 6,909,617 B1 | 6/2005 | Mirskiy | |
| 7,007,176 B2 * | 2/2006 | Goodfellow et al. | 713/300 |
| 7,898,825 B2 * | 3/2011 | Mulligan et al. | 363/21.13 |
| 8,278,899 B2 * | 10/2012 | Schafmeister et al. | 323/283 |
| 8,319,486 B2 * | 11/2012 | Maksimovic et al. | 323/283 |
| 2005/0168198 A1 * | 8/2005 | Maksimovic et al. | 323/222 |

OTHER PUBLICATIONS

Ramesh Kankanala, "Phase-Shifted Full-Bridge (PSFB) Quarter Brick DC/DC Converter Reference Design Using a dsPIC® DSC", Microchip Technology, DSO1335A—pp. 1-94 (2010).
Poley et al., "Digital Peak Current Mode Control with Slope Compensation using the TMS320F2803X", Texas Instruments Application Report, SPRABE7, pp. 1-28 (Jun. 2010).
Chattopadhyay et al., Dissertation—"A Digital Current Mode Control Technique for DC-DC Converters" IEEE Transactions on Power Electronics, vol. 21, No. 6 (Nov. 2006).
Jian Li, Dissertation—"Current-Mode Control: Modeling and its Digital Application" (Apr. 14, 2009).
Kai Wan, "Advanced Current-Mode Control Techniques for DC-DC Power Electronic Converters" ( 2009).

* cited by examiner

*Primary Examiner* — Gary L Laxton
(74) *Attorney, Agent, or Firm* — William B. Kempler; Frederick J. Telecky, Jr.

(57) ABSTRACT

A digital control circuit is provided for use with a switch-mode power converter that receives an input signal at a first input node and a control signal at a second input node, and that provides an output signal at a first output node and a current signal at a second output node. The digital control circuit generates a programmable current reference signal based on a difference between the output signal and a voltage reference signal, calculates a time instant when the current signal substantially equals the programmable reference current signal, and generates the control signal based on the calculated time instant.

23 Claims, 7 Drawing Sheets

DIGITAL PEAK CURRENT MODE CONTROL FOR SWITCH-MODE POWER CONVERTERS

BACKGROUND

This invention relates generally to switch-mode power converters. More particularly, this invention relates to methods and apparatus for digital peak current mode control for switch-mode power converters.

Switch-mode power converters typically include one or more semiconductor switches and energy storage elements, such as inductors and capacitors, and operate by switching the energy storage elements between various circuit configurations at a predetermined switching frequency. In a pulse-width modulated ("PWM") converter, the output voltage or current of the power converter can be regulated by varying the duty cycle of the control signal that is applied to the switches.

Analog control methods traditionally have been used to provide line and load regulation of switch-mode power converters, such as DC-DC, AC-DC, DC-AC and AC-AC converters. Analog control techniques offer simplicity, high bandwidth and low implementation cost. Conventional analog control techniques for switch-mode power converters include voltage-mode and current-mode control.

Voltage-mode control is a single-loop control technique that causes the converter output voltage to track a reference voltage. In particular, the output voltage is compared to the reference voltage, and the error signal is used to set a switch duty ratio of the converter. By varying the switch duty ratio, the average voltage across the inductor, and hence the inductor current, are adjusted. This causes the output voltage to follow the reference voltage.

Current-mode control, in contrast, is a two-loop control method that includes current and voltage control loops, and causes the inductor current to track a reference current. In the voltage control loop, the error signal between the output voltage and reference voltage is used to generate a reference current. The current loop compares the reference current to the inductor current to control the switch duty ratio. In this way, some aspect (e.g., peak, valley, average, or some other aspect) of the inductor current tracks the reference current, and the output voltage tracks the reference voltage.

Peak current mode control refers to a control mode in which the peak value of the inductor current tracks the reference current, and offers numerous advantages for some power converter applications. Indeed, peak current mode control phase-shifted PWM ("PSPWM") full bridge is the topology of choice for many power supply manufacturers. In such a control scheme, control signals for switches on one leg of the converter are phase-shifted relative to the control signals for switches on the other leg, with the phase shift determined based on peak inductor current. The benefits of this topology include high efficiency, cycle-by-cycle current limit, transformer flux balance, and near ideal audio susceptibility. Such converters have traditionally been implemented using analog control techniques.

Analog control techniques, however, have several disadvantages, such as large component count, low flexibility, low reliability, and high sensitivity to temperature, ageing and component tolerances. Moreover, previously known peak current mode controllers typically include high speed analog comparators and require numerous external components for configuration.

In recent years, digital control techniques for power converters have become more practical, particularly with the advent of high-performance, high speed, low cost digital signal processors, analog-to-digital ("A/D") converters and digital-to-analog ("D/A") converters. Indeed, digital controllers offer many advantages, including programmability, flexibility, simplicity, and immunity to environmental variations.

Although various digital control techniques for power converters have been successfully implemented, a fully digital implementation of peak current mode control has proven difficult to achieve. In particular, previous attempts to implement a digital controller that senses and reliably terminates a peak inductor current without producing limit cycles have been met with limited to no success.

However, the benefit of digital peak current mode control could be used to leverage the advantages of commercially available, low-cost, high-performance digital processors. Such an implementation could result in a net reduction in component count and cost, and also provide numerous other advantages.

Accordingly, improved methods and apparatus for digital peak current mode control for switch-mode power converters are desirable.

SUMMARY

In a first aspect of the invention, a digital control circuit is provided for use with a switch-mode power converter that receives an input signal at a first input node and a control signal at a second input node, and that provides an output signal at a first output node, and a current signal at a second output node. The digital control circuit includes a first input node coupled to receive the output signal at the first output node of the switch-mode power converter, a second input node coupled to receive the current signal at the second output node of the switch-mode power converter, and an output node coupled to provide the control signal at the second input node of the switch-mode power converter. The digital control circuit (a) generates a programmable current reference signal based on a difference between the output signal and a voltage reference signal, (b) calculates a time instant when the current signal substantially equals the programmable reference current signal, and (c) generates the control signal based on the calculated time instant.

In a second aspect of the invention a digital control circuit is provided for use with a switch-mode power converter that receives an input voltage signal at a first input node and a control signal at a second input node, and that provides an output voltage signal at a first output node and an inductor current signal at a second output node. The digital control circuit includes a voltage control loop and a current control loop. The voltage control loop includes an input node coupled to receive the output voltage signal at the first output node of switch-mode power converter, and provides a current reference signal at an output node based on a difference between the output voltage signal and a reference voltage signal. The current control loop includes a first input node coupled to receive the current reference signal at the output node of the voltage control loop, a second input node coupled to receive the inductor current signal at the first output node of switch-mode power converter, and an output node coupled to provide a control signal at the second input node of the switch-mode power converter. The current control loop (a) generates a programmable current reference signal based on the current reference signal, (b) determines a current error signal based on a difference between the programmable current reference signal and the inductor sense current, (c) calculates a time instant when the inductor current signal substantially equals the programmable current reference signal based on the current error signal, and (d) generates the control signal based on the calculated time instant.

In a third aspect of the invention, a method is provided for providing peak current mode control for a switch-mode power converter that receives an input signal and a control signal, and that provides an output signal and a current signal. The method includes using a digital controller to (a) generate a programmable current reference signal based on a difference between the output signal and a voltage reference signal, (b) calculate a time instant when a peak value of the current signal substantially equals the programmable reference current signal, and (c) generate the control signal based on the calculated time instant.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Exemplary methods and apparatus in accordance with this invention provide digital peak current mode control for switch-mode power converters. In exemplary embodiments, digital peak current mode controllers in accordance with this invention include a voltage control loop and a current control loop. The voltage control loop receives an output signal (e.g., an output voltage signal) from the switch-mode power converter, and generates a current reference signal based on a difference between the output voltage signal and a voltage reference signal.

The current control loop receives the current reference signal from the voltage control loop, and generates a current reference signal with user-programmable slope compensation (referred to herein as the "programmable current reference signal"). Numerous aspects of the programmable current reference signal may be set by user control, such as slope, frequency, gain, DC offset, and other parameters.

The current control loop also receives a sensed current signal (e.g., an inductor current signal) from the power converter, and generates a sampled-data error signal having sample values equal to a difference between the programmable current reference signal and the sensed inductor current signal. The sample rate of the error signal may be equal to or greater than the clock frequency of the switch-mode power converter. For example, the error signal may have a clock frequency that is between 1-8 times the clock frequency of the switch-mode power converter, although other values may be used. For each cycle of the switch-mode power converter clock, the current control loop uses samples of the sampled-data error signal to calculate a time instant (referred to herein as "the peak time instant") at which the sensed inductor current signal substantially equals the programmable current reference signal. Based on the calculated peak time instant, the current control loop controls the switch duty ratio of the switch-mode power converter so that the sensed inductor current signal has a peak value that follows the programmable current reference signal.

Figure 1:
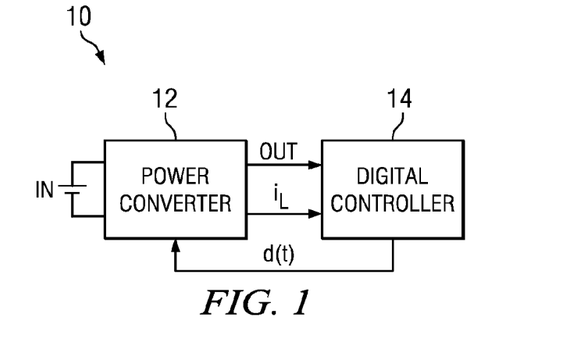
FIG. 1 is a block diagram of a power supply that includes an exemplary digital peak current mode controller in accordance with this invention.

Referring to FIG. 1, a block diagram of a power supply 10 that includes an exemplary digital peak current mode controller in accordance with this invention is described. In particular, power supply 10 includes a switch-mode power converter 12 and a digital controller 14. As described in more detail below, digital controller 14 provides digital peak current mode control for power supply 10 in accordance with this invention.

Switch-mode power converter 12 has a first input node coupled to an input signal IN, and a second input node coupled to a control signal d(t), and provides an output signal OUT at a first output node, and a current signal $i_L$ at a second output node.

Switch-mode power converter 12 may be a DC-DC, AC-DC, DC-AC or AC-AC converter that converts input signal IN to output signal OUT. For example, switch-mode power converter 12 may be a DC-DC converter that converts a DC input voltage IN to a DC output voltage OUT. Persons of ordinary skill in the art will understand that input signal IN alternatively may be a DC current or an AC voltage or current, and output signal OUT alternatively may be a DC current or an AC voltage or current.

Switch-mode power converter 12 may be a buck converter, a boost converter, a buck-boost converter, or other similar converter, that may include one or more inductors, capacitors, diodes and switches (not shown in FIG. 1), as is known in the art. As described in more detail below, the switches are controlled by control signal d(t), which is a digital control signal that has a clock frequency $f_s$ (the clock frequency of switch-mode power converter 12), and whose duty ratio may be used to control current signal $i_L$ and/or output signal OUT.

Digital controller 14 may be a microprocessor or other similar digital controller. For example, digital controller 14 may be a UCD3040 microprocessor by Texas Instruments Inc., Dallas, Tex. Digital controller 14 may be a single controller, or may include multiple controllers. Digital controller 14 has first and second input nodes coupled to receive output signal OUT and current signal $i_L$, respectively, at the first and second output nodes, respectively, of switch-mode power converter 12, and provides control signal d(t) at an output node coupled to the second input node of switch-mode power converter 12.

In accordance with this invention, and as described in more detail below, digital controller 14 receives output signal OUT and current signal $i_L$ from switch-mode power converter 12, generates a programmable current reference signal based on a difference between output signal OUT and a voltage reference signal, calculates a peak time instant when a peak value of current signal $i_L$ substantially equals the programmable reference current signal, and generates control signal d(t) based on the calculated peak time instant.

In exemplary embodiments of this invention, current signal $i_L$ represents a current flowing in an inductor in switch-mode power converter 12. Persons of ordinary skill in the art will understand that current signal $i_L$ alternatively may represent some other current in switch-mode power converter 12 that is approximately equal to a current flowing in an inductor in switch-mode power converter 12. For example, the switch current is approximately equal to the inductor current during the conduction time of the switch. For simplicity, the remaining discussion refers to current signal $i_L$ as inductor current signal $i_L$.

Control signal d(t) may include one signal, or may include more than one signal (e.g., four signals as used in a PSPWM full-bridge converter) for controlling one or more switches in switch-mode power converter 12. For simplicity, control signal d(t) is described as including one signal in the remaining discussion. Persons of ordinary skill in the art will understand that exemplary techniques in accordance with this invention easily may be modified to generate control signals d(t) that include more than one signal.

Figure 2:
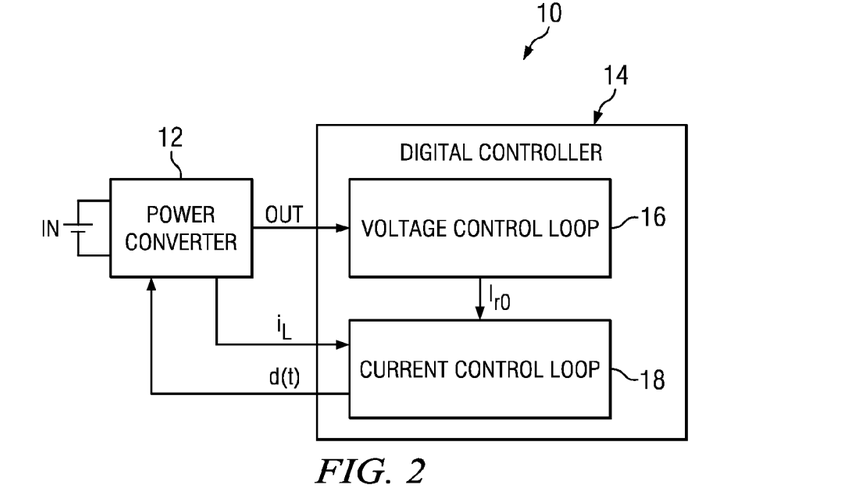
FIG. 2 is a more detailed block diagram of the power supply and exemplary digital peak current mode controller of FIG. 1.

Referring now to FIG. 2, a more detailed block diagram of power supply 10 is described. In particular, digital controller 14 includes a voltage control loop 16 and a current control loop 18. Voltage control loop 16 includes a first input node coupled to receive output signal OUT at the first output node of switch-mode power converter 12, and provides a current reference signal $I_{r0}$ at an output node. Current control loop 18 includes a first input node coupled to receive current reference signal $I_{r0}$ at the output node of voltage control loop 16, a second input node coupled to receive inductor current signal $i_L$ at the second output node of switch-mode power converter 12, and provides control signal d(t) at an output node coupled to the second input node of switch-mode power converter 12.

As described in more detail below, voltage control loop 16 generates current reference signal $I_{r0}$ based on a difference between output signal OUT and a voltage reference signal (not shown in FIG. 2). Current control loop 18 generates a programmable current reference signal based on current reference signal $I_{r0}$, calculates a peak time instant when the peak value of inductor current signal $i_L$ substantially equals the programmable reference current signal, and generates control signal d(t) based on the calculated peak time instant.

Figure 3:
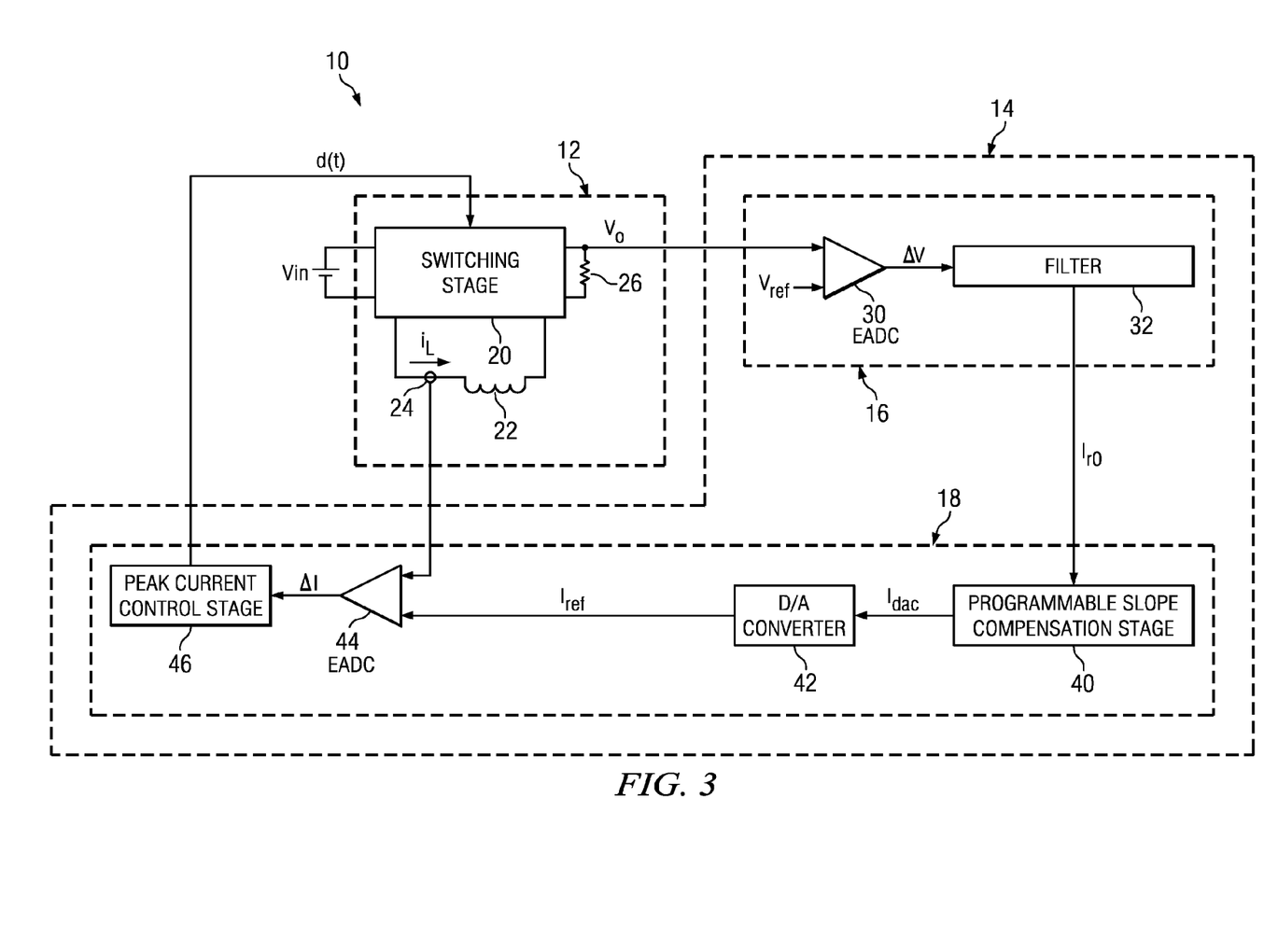
FIG. 3 is a more detailed block diagram of the power supply and exemplary digital peak current mode controller of FIG. 2.

Referring now to FIG. 3, a more detailed exemplary embodiment of power supply 10 is described. In this example, input signal IN is an input voltage signal $V_{in}$, and output signal OUT is an output voltage signal $V_O$. Persons of ordinary skill in the art will understand that input signal IN alternatively may be an input current signal, and/or output signal OUT alternatively may be an output current signal. For simplicity, the remaining discussion refers to input signal IN as input voltage signal $V_{in}$, and output signal OUT as output voltage signal $V_O$.

As shown in FIG. 3, switch-mode power converter 12 includes a switching stage 20, an inductor 22, a current sense device 24, and a load 26. Switching stage 20 may be any conventional switching network, and may include one or more switches (not shown) controlled by control signal d(t) having a clock frequency $f_s$. Clock frequency $f_s$ may be between about 50 KHz to about 5 MHz, although other clock frequencies may be used. Inductor 22 may include one or more inductors, as is known in the art. For simplicity, load 26 is depicted as a resistor, but may be any type of load.

Current sense device 24 may be a resistor, a transistor, an RC network, a Hall effect sensor, a current transformer, a MOSFET Rds(on), and inductor DC resistance, or other similar device for detecting current $i_L$ in inductor 22. Current sense device 24 may be in series with inductor 22, as shown in FIG. 3, or alternatively may be implemented in parallel with inductor 22, or may be implemented by measuring parameters of some other circuit element in switching stage 20. In this regard, current sense device may directly detect current $i_L$, or may indirectly detect current $i_L$ in inductor 22 based on some other current in switch-mode power converter 12 that is proportional to current $i_L$.

Voltage control loop 16 includes error-analog-to-digital converter ("EADC") 30 and filter 32. EADC 30 has a first input node coupled to receive output voltage signal $V_O$ at the first output node of switch-mode power converter 12, a second input node coupled to a voltage reference signal $V_{ref}$ and provides a voltage error signal $\Delta V$ at an output node.

Figure 4:
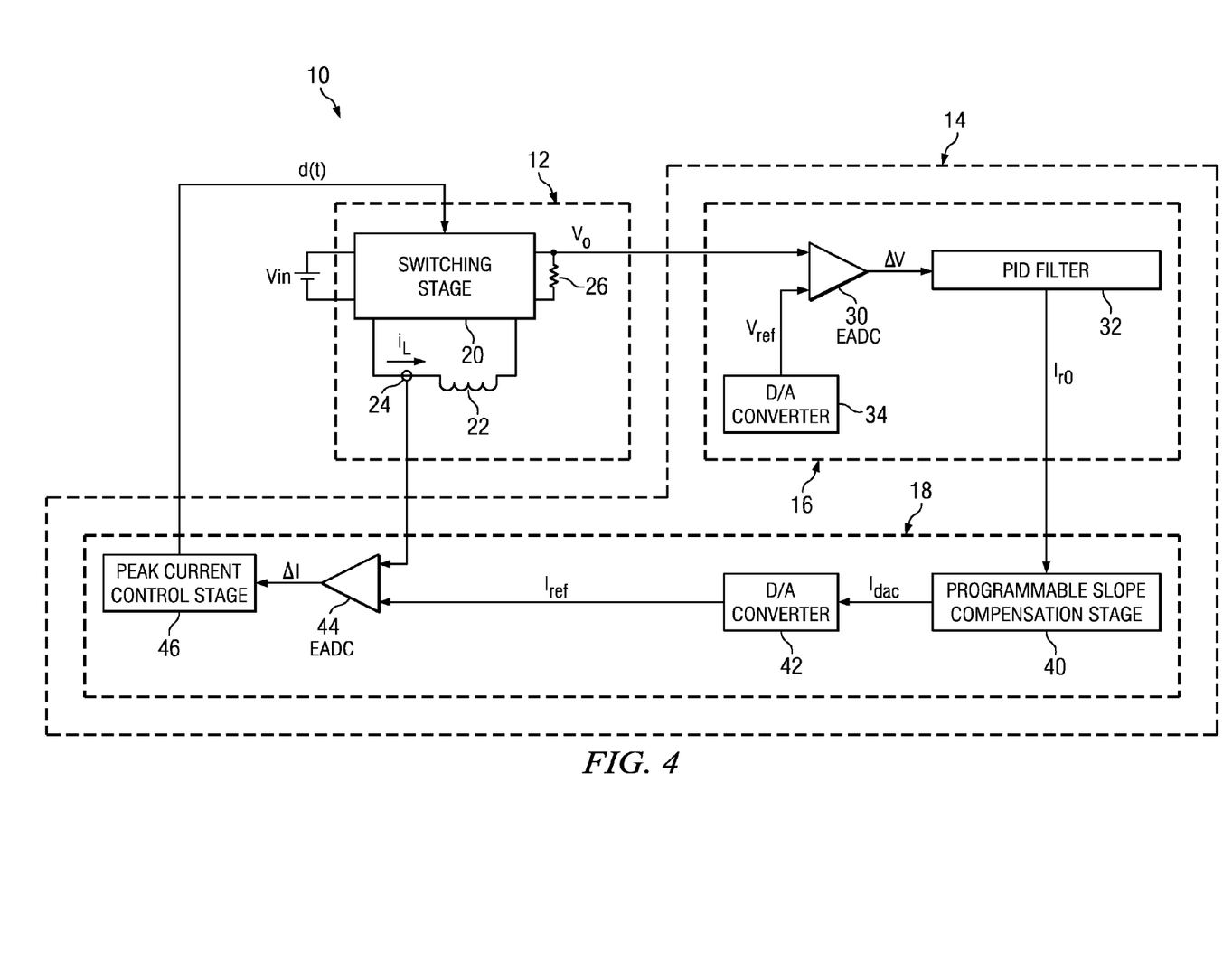
FIG. 4 is a block diagram of a power supply including an alternative exemplary digital peak current mode controller in accordance with this invention.

Voltage reference signal $V_{ref}$ equals the desired output voltage of switch-mode power converter 12. Alternatively, voltage reference signal $V_{ref}$ may equal a fraction of the desired output voltage of switch-mode power converter 12. Voltage reference signal $V_{ref}$ may be generated by digital controller 14, or may be generated externally and provided as an input to digital controller 14. Voltage reference signal $V_{ref}$ may be generated using any of a variety of different techniques. For example, as shown in FIG. 4, voltage control loop 16 may include a D/A converter 34 that may be used to generate voltage reference signal $V_{ref}$. Other techniques may be used to generate voltage reference signal $V_{ref}$.

Referring again to FIG. 3, EADC 30 samples the difference between output voltage signal $V_O$ and voltage reference signal $V_{ref}$ and converts the difference to a digital voltage error signal $\Delta V$ (e.g., $\Delta V = V_O - V_{ref}$) at a sampling rate $f_{ad1}$. Sampling rate $f_{ad1}$ is typically equal to or greater than clock frequency $f_s$ of control signal d(t), and may be between about 50 kHz to about 32 MHz, although other sampling frequencies may be used. Persons of ordinary skill in the art will understand that other techniques may be used to generate voltage error signal $\Delta V$. For example, EADC 30 may be replaced with an analog differencing circuit and a conventional A/D converter.

Filter 32 has an input node coupled to receive voltage error signal $\Delta V$ at the output node of EADC 30, and provides current reference signal $I_{r0}$ at an output node. Filter 32 conditions output voltage signal $V_O$ so that any differences between output voltage signal $V_O$ and reference voltage signal $V_{ref}$ are made small (ideally, $\Delta V = 0$). The conditioning is performed to reduce the difference in the presence of disturbances, such as load steps, input voltage variations, component variations, temperature effects, and other similar disturbances). For example, filter 32 may have a gain of 1000, a first zero at 1 KHz, a second zero at 1 KHz, and a pole=10 KHz, although other parameters may be used. As shown in FIG. 4, in one exemplary embodiment, filter 32 may be implemented as a PID filter, having the following parameters: Kp=0.19, Ki=0.0015708, Kd=0.700038 and α=0.72849. Persons of ordinary skill in the art will understand that other filter types and parameters may be used.

Referring again to FIG. 3, current control loop 18 includes programmable slope compensation stage 40, D/A converter 42, EADC 44 and peak current control stage 46. Programmable slope compensation stage 40 has a first input node coupled to receive current reference signal $I_{r0}$ at the output node of filter 32, and provides a digital programmable current reference signal $I_{dac}$ at an output node. D/A converter 42 converts digital programmable current reference signal $I_{dac}$ to an analog programmable current reference signal $I_{ref}$ at an output node.

In particular, programmable slope compensation stage 40 generates digital programmable current reference signal $I_{dac}$ having a digital count equal to current reference signal $I_{r0}$ plus a periodic ramp signal $I_{ramp}$ whose parameters (e.g., slope, frequency, gain and DC offset) may be set based on user control:

$$I_{dac} = I_{r0} + I_{ramp} \quad (1)$$

D/A converter 42 converts digital programmable current reference signal $I_{dac}$ to analog programmable current reference signal $I_{ref}$.

Figure 5A:
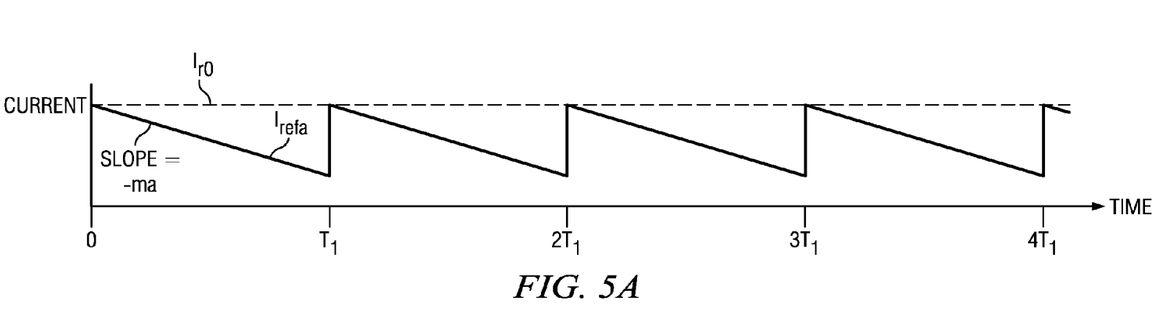
FIGS. 5A-5C illustrate exemplary programmable current reference signals in accordance with this invention.
Figure 5B:
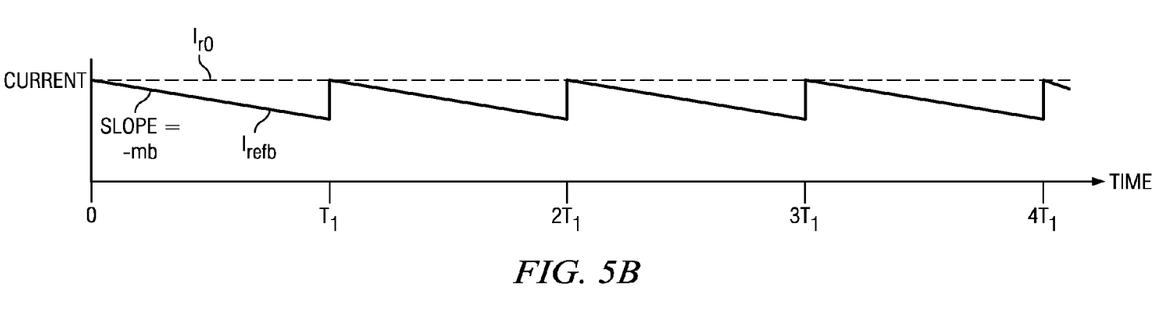
Figure 5C:
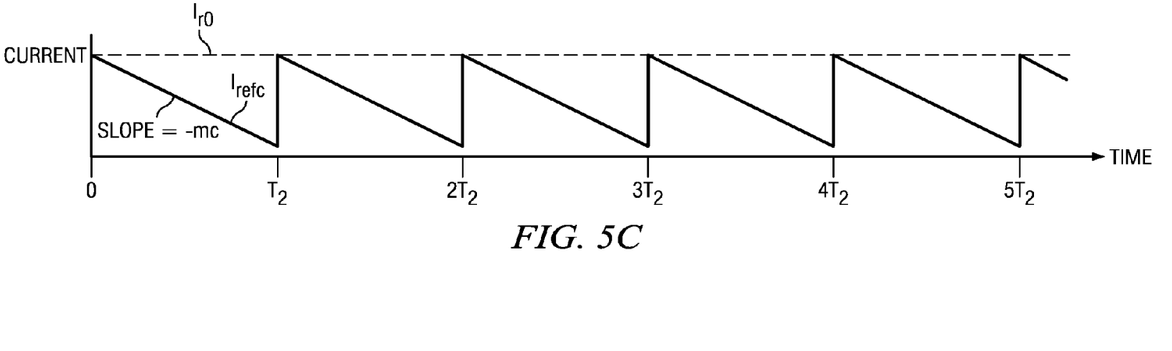

For example, FIG. 5A illustrates an exemplary programmable current reference signal $I_{refa}$, which has an initial value $I_{r0}$, a slope $-ma$, and a frequency $1/T1$. Under user control, the slope, frequency, gain and DC offset of programmable current reference signal $I_{ref}$ may be modified. For example, FIG. 5B illustrates an alternative exemplary programmable current reference signal $I_{refb}$, which has an initial value $I_{r0}$, a slope $-mb$, and a frequency $1/T1$. Alternatively, FIG. 5C, illustrates another alternative exemplary programmable current reference signal $I_{refc}$, which has an initial value $I_{r0}$, a slope $-mc$, and a frequency $1/T2$. Persons of ordinary skill in the art will understand that programmable current reference signal $I_{ref}$ also may have zero slope, in which case $I_{ref} = I_{r0}$.

Programmable slope compensation stage 40 may be implemented using any of a variety of techniques. For example, programmable slope compensation stage 40 may include a digital counter (not shown) whose starting value is set to current reference signal $I_{r0}$, and whose count is decremented by a user-selectable predetermined step δi once per clock interval. The clock interval may be synchronized to the sampling interval of EADC 44, described below. Programmable slope compensation stage 40 may reset the digital counter to current reference signal $I_{r0}$ at the start of each switching cycle.

Referring again to FIG. 3, EADC 44 provides at an output node a sampled-data current error signal ΔI equal to the difference between inductor current signal $i_L$ and programmable current reference signal $I_{ref}$ (e.g., $\Delta I = i_L - I_{ref}$). In particular, EADC 44 samples the difference between inductor current signal $i_L$ and programmable current reference signal $I_{ref}$, and converts the difference to current error signal ΔI at a sampling rate $f_{ad2}$. Sampling rate $f_{ad2}$ may be equal to or greater than clock frequency $f_s$ of control signal d(t), and may be between about 50 KHz to about 32 MHz, although other sampling frequencies may be used. Sampling rate $f_{ad2}$ of EADC 44 may be the same as sampling rate $f_{ad1}$ of EADC 30, or the two sampling rates may be different from one another.

Peak Current Control Stage 46 has an input node coupled to receive current error signal ΔI at the output node of EADC 44, and provides control signal d(t) at an output node. Control signal d(t) has a clock rate $f_s$, and a period $T_s = 1/f_s$.

In accordance with this invention, and as described in more detail below, based on current error signal ΔI, Peak Current Control Stage 46 implements and algorithm to calculate for each clock period $T_s$ ($0 < t_c < T_s$) a peak time instant $t_c$ at which inductor current signal $i_L$ substantially equals programmable current reference signal $I_{ref}$. Based on calculated peak time instants $t_c$, Peak Current Control Stage 46 generates control signal d(t).

Figure 6:
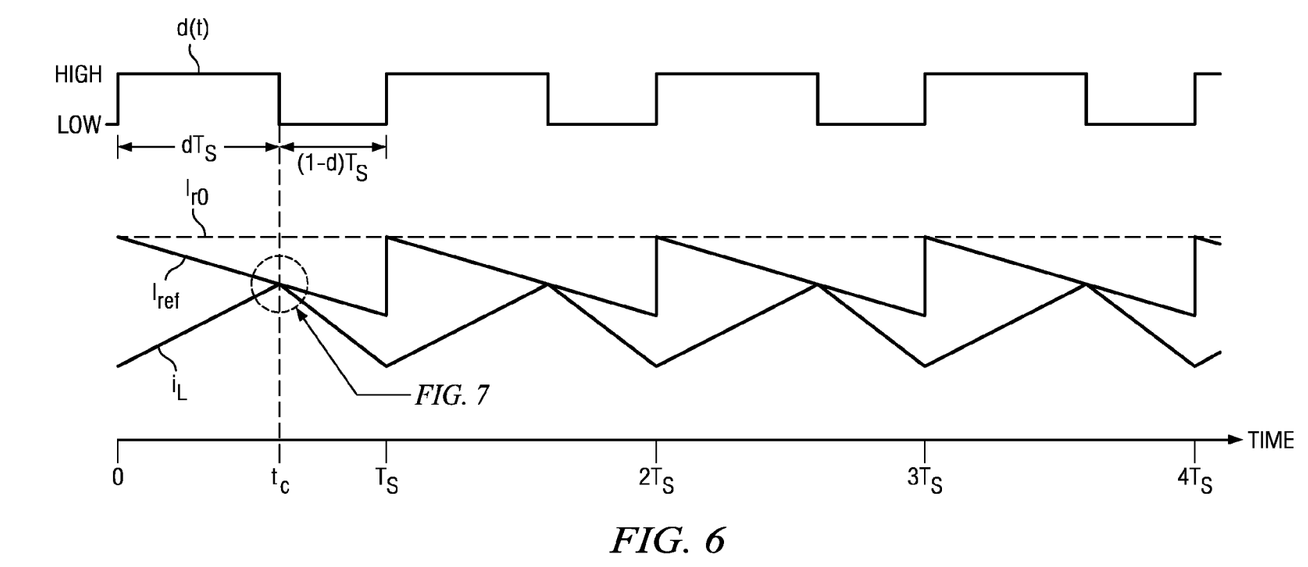
FIG. 6 illustrates the operation of an exemplary peak current control stage in accordance with this invention.
Figure 7:
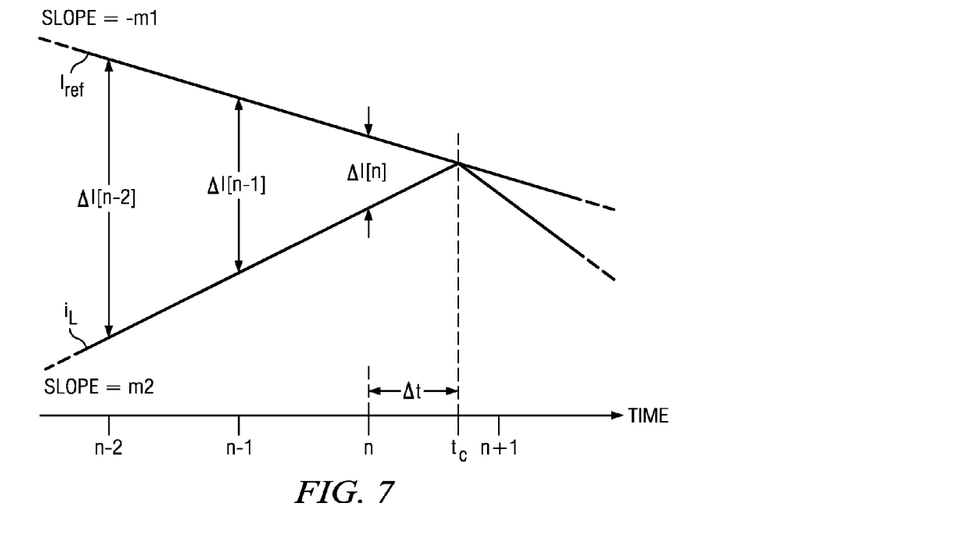
FIG. 7 illustrates an enlarged view of a portion of the exemplary signals illustrated in FIG. 6.

FIGS. 6 and 7 illustrate the operation of exemplary Peak Current Control Stage 46. In particular, FIG. 6 illustrates exemplary current reference signal $I_{r0}$, programmable current reference signal $I_{ref}$, inductor current signal $i_L$, and digital control signal d(t). At the start of each clock cycle, control signal d(t) transitions from LOW to HIGH. Persons of ordinary skill in the art will understand that control signal d(t) alternatively may transition from HIGH to LOW at the start of each clock cycle.

After control signal d(t) transitions from LOW to HIGH, inductor current signal $i_L$ begins to increase, and programmable current reference signal $I_{ref}$ begins to decrease. In accordance with this invention, Peak Current Control Stage 46 implements an algorithm to calculate a peak time instant $t_c$ at which inductor current signal $i_L$ substantially equals programmable current reference signal $I_{ref}$. At $t_c$, inductor current signal $i_L$ reaches its desired peak value, and Peak Current Control Stage 46 causes control signal d(t) to transition from HIGH to LOW (or alternatively from LOW to HIGH). This will in turn control one or more switches in switching stage 20 (e.g., turning the switches OFF), so that inductor current signal $i_L$ stops increasing.

In an exemplary embodiment, Peak Current Control Stage 46 calculates peak time instants $t_c$ in accordance with the following exemplary algorithm. Persons of ordinary skill in the art will understand that other algorithms may be used. In each time period $T_s$, programmable current reference signal $I_{ref}$ and inductor current signal $i_L$ can be described by the following equations:

$$I_{ref}(t) = -m_1(t) + I_{r0} \quad (2)$$

$$i_L(t) = m_2(t) + b \quad (3)$$

where $m_1$ is the slope of the slope compensation ramp, $m_2$ is the slope of inductor current signal $i_L$, b is an offset value and t is time.

Current error signal ΔI is a digital signal having sample values $\Delta I[1], \Delta I[2], \ldots, \Delta I[n-2], \Delta I[n-1], \Delta I[n], \Delta I[n=1], \ldots$. As shown in FIG. 7, assume that $n < t_c < n+1$. At t=n, equations (2) and (3) may be written as:

$$I_{ref}(n) = -m_1(n) + I_{r0} \quad (4)$$

$$i_L(n) = m_2(n) + b \quad (5)$$

In addition, at t=n, current error ΔI[n] may be expressed as $$\Delta I[n] = I_{ref}(n) - i_L(n) \quad (6)$$

If $\Delta I[n] < (m_1 + m_2)$, the peak current crossing occurs at $t = t_c$ in the next sampling interval. As shown in FIG. 7, $I_{ref}(t)$ and $i_L(t)$ cross at the point:

$$t_c = (n + \Delta t) \quad (7)$$

At this peak time instant, $I_{ref}(t_c)$ and $i_L(t_c)$ are equal:

$$I_{ref}(n + \Delta t) = i_L(n + \Delta t) \quad (8)$$

From equations (4), (5) and (8):

$$-m_1(n + \Delta t) + I_{r0} = m_2(n + \Delta t) + b \quad (9)$$

rearranging the terms:

$$\{-m_1(n) + I_{r0}\} - m_1(\Delta t) = \{m_2(n) + b\} + m_2(\Delta t) \quad (10)$$

from equations (4), (5) and (10):

$$I_{ref}(n) - m_1(\Delta t) = i_L(n) + m_2(\Delta t) \quad (11)$$

$$I_{ref}(n) - i_L(n) = (m_1 + m_2)(\Delta t) \quad (12)$$

combining equations (6) and (12):

$$\Delta I[n] = (m_1 + m_2)(\Delta t) \quad (13)$$

solving for Δt:

$$\Delta t = \frac{\Delta I[n]}{(m_1 + m_2)} \quad (14)$$

The values n, $m_1$, and $\Delta I[n]$, are known. The slope $m_2$ of slope of inductor current signal $i_L$ can be determined from the following equation:

$$m_2 = \{\Delta I[n] - \Delta I[n-1]\} - m_1 \quad (15)$$

Thus, from equations (7) and (14), Δt and peak crossing instant $t_c$ can be determined.

Referring again to FIG. 6, after determining peak crossing instant $t_c$, Peak Current Control Stage 46 causes control signal d(t) to transition from HIGH to LOW (or alternatively from LOW to HIGH). Although the transition appears to occur instantaneously at t=$t_c$, persons of ordinary skill in the art will understand that the transition may occur after a small delay (e.g., within about 50 nsec to about 200 nsec of $t_c$) based on sampling rate $f_{ad2}$ and the frequency of digital logic in digital controller 14 that performs mathematical calculations.

This process continues, with Peak Current Control Stage 46 calculating peak crossing instant $t_c$ for each cycle $T_s$ of control signal d(t). Unlike previously known peak current mode controllers, exemplary digital peak current mode controllers in accordance with this invention require no analog comparators.

Figure 8:
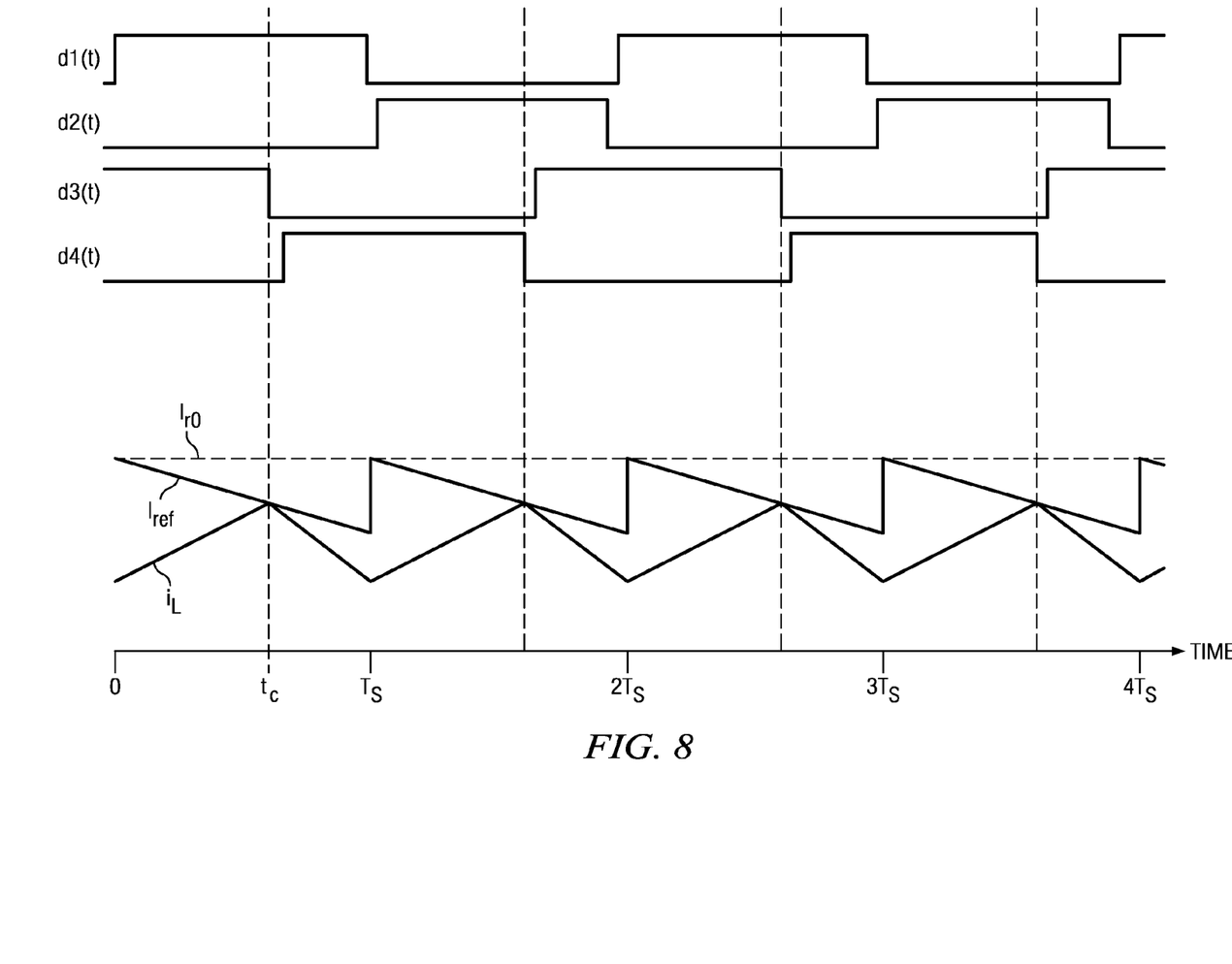
FIG. 8 illustrates the operation of an alternative exemplary peak current control stage in accordance with this invention.
Figure 9:
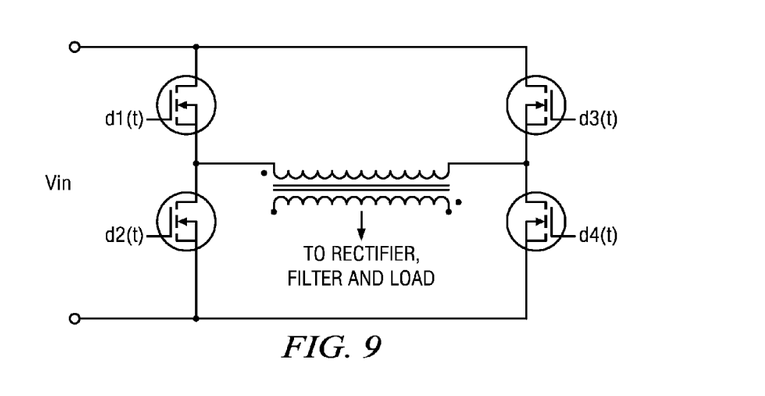
FIG. 9 illustrates a simplified block diagram of a portion of an exemplary phase-shifted pulse-width modulated converter for use with the exemplary control signals of FIG. 8.

Persons of ordinary skill in the art will understand that digital peak current mode control methods and apparatus in accordance with this invention may be used with PSPWM full-bridge converters. FIG. 8 illustrates exemplary control signal d(t), which includes four control signals d1(t), d2(t), d3(t) and d4(t) for use with an exemplary PSPWM full-bridge converter, such as shown in FIG. 9. As shown in FIG. 8, control signals d3(t) and d4(t) are phase-shifted relative to control signals d1(t) and d2(t), with the phase shift controlled by the peak crossing instant $t_c$ for each cycle $T_s$.

The foregoing merely illustrates the principles of this invention, and various modifications can be made by persons of ordinary skill in the art without departing from the scope and spirit of this invention.

The invention claimed is:

1. A digital control circuit for use with a switch-mode power converter that receives an input signal at a first input node and a control signal at a second input node, and that provides an output signal at a first output node and a current signal at a second output node, the digital control circuit comprising:
the first input node coupled to receive the output signal at the first output node of the switch-mode power converter;
the second input node coupled to receive the current signal at the second output node of the switch-mode power converter; and
an output node coupled to provide the control signal at the second input node of the switch-mode power converter,
wherein the digital control circuit: (a) generates a programmable current reference signal based on a difference between the output signal and a voltage reference signal; (b) mathematically predicts, utilizing a prediction algorithm, a time instant in the future when the peak current signal substantially equals the programmable reference current signal; and (c) generates the control signal based on the mathematically computed time instant.

2. The digital control circuit of claim 1, wherein the digital control circuit:
generates a current reference signal based on a difference between the output signal and the voltage reference signal; and
generates the programmable current reference signal based on the current reference signal and a programmable slope compensation signal.

3. The digital control circuit of claim 2, wherein the programmable slope compensation signal comprises a ramp signal having a programmable slope.

4. The digital control circuit of claim 1, wherein the digital control circuit generates a current error signal based on a difference between the current signal and the programmable current reference signal, and calculates the time instant based on the current error signal.

5. The digital control circuit of claim 1, wherein the digital control circuit adjusts a duty cycle of the control signal based on the calculated time instant.

6. The digital control circuit of claim 1, wherein the digital control circuit adjusts a phase of the control signal based on the calculated time instant.

7. The digital control circuit of claim 1, wherein the digital control circuit generates the control signal so that the current signal has a peak value based on the programmable current reference signal.

8. A digital control circuit for use with a switch-mode power converter for receiving an input voltage signal at a first input node and a control signal at a second input node, and that provides an output voltage signal at a first output node and an inductor current signal at a second output node, the digital control circuit comprising:
a voltage control loop comprising an input node couplable to receive the output voltage signal at the first output node of switch-mode power converter, wherein the voltage control loop provides a current reference signal at an output node based on a difference between the output voltage signal and a reference voltage signal; and
a current control loop comprising the first input node couplable to receive the current reference signal at the output node of the voltage control loop, the second input node couplable to receive the inductor current signal at the first output node of switch-mode power converter, and a second output node couplable to provide a control signal at a second input node of the switch-mode power converter,
wherein the current control loop: (a) generates a programmable current reference signal based on the current reference signal; (b) determines a current error signal based on a difference between the programmable current reference signal and the inductor sense current; (c) mathematically computes a time instant when the peak inductor current signal substantially equals the programmable current reference signal based on the current error signal; and (d) generates the control signal based on the mathematically computed time instant.

9. The digital control circuit of claim 8, wherein the current control loop generates the programmable current reference signal based on the current reference signal and a programmable slope compensation signal.

10. The digital control circuit of claim 9, wherein the programmable slope compensation signal comprises a ramp signal having a programmable slope.

11. The digital control circuit of claim 8, wherein the current error signal comprises a sampled data signal based on samples of the difference between the programmable current reference signal and the inductor sense current.

12. The digital control circuit of claim 8, wherein the control signal comprises a clock cycle, and the current control loop calculates the time instant once per clock cycle.

13. The digital control circuit of claim 8, wherein the current control loop generates the control signal so that the inductor current signal has a peak value based on the programmable current reference signal.

14. The digital control circuit of claim 8, wherein the current control loop adjusts a duty cycle of the control signal based on the calculated time instant.

15. A method for providing peak current mode control for a switch-mode power converter that receives an input signal and a control signal, and that provides an output signal and a current signal, the method comprising:
using a digital controller to: (a) generate a programmable current reference signal based on a difference between the output signal and a voltage reference signal; (b) mathematically predicting, utilizing a prediction algorithm, a time instant in the future when a peak value of the current signal substantially equals the programmable reference current signal; and (c) generate the control signal based on the mathematically computed time instant.

16. The method of claim 15, further comprising using the digital controller to:
generate a current reference signal based on a difference between the output signal and the voltage reference signal; and
generates the programmable current reference signal based on the current reference signal and a programmable slope compensation signal.

17. The method of claim 16, wherein the programmable slope compensation signal comprises a ramp signal having a programmable slope.

18. The method of claim 15, further comprising using the digital controller to:
generate a current error signal based on a difference between the current signal and the programmable current reference signal; and
calculate the time instant based on the current error signal.

19. The method of claim 15, further comprising using the digital controller to adjust a duty cycle of the control signal based on the calculated time instant.

20. The method of claim 15, further comprising using the digital controller to generate the control signal so that the current signal has a peak value based on the programmable current reference signal.

21. A digital control circuit for use with a switch-mode power converter that receives an input signal at a first input node and a control signal at a second input node, and that provides an output signal at a first output node and a current signal at a second output node, the digital control circuit comprising:
the first input node coupled to receive the output signal at the first output node of the switch-mode power converter;
the second input node coupled to receive the current signal at the second output node of the switch-mode power converter; and
an output node coupled to provide the control signal at the second input node of the switch-mode power converter,
wherein the digital control circuit: (a) generates a programmable current reference signal based on a difference between the output signal and a voltage reference signal; (b) mathematically computes utilizing a prediction algorithm a time instant when the peak current signal substantially equals the programmable reference current signal; and (c) generates the control signal based on the mathematically computed time instant,
wherein the time instant when the current signal substantially equals the programmable reference current signal is mathematically computed by:

$$\Delta t = \frac{\Delta I[n]}{(m_1 + m_2)}$$

where $\Delta I[n] = I_{ref}(n) - i_L(n)$
$I_{ref}$=programmable current reference signal
$i_L$=inductor current signal
$m_1$ is the slope of the slope compensation ramp $m_2$ is the slope of inductor current signal.

22. The digital control circuit of claim 8 wherein the time instant when the current signal substantially equals the programmable reference current signal is mathematically computed by:

$$\Delta t = \frac{\Delta I[n]}{(m_1 + m_2)}$$

where $\Delta I[n] = I_{ref}(n) - i_L(n)$
$I_{ref}$=programmable current reference signal
$i_L$=inductor current signal
$m_1$ is the slope of the slope compensation ramp
$m_2$ is the slope of inductor current signal.

23. A method for providing peak current mode control for a switch-mode power converter that receives an input signal and a control signal, and that provides an output signal and a current signal, the method comprising:
using a digital controller to: (a) generate a programmable current reference signal based on a difference between the output signal and a voltage reference signal; (b) mathematically compute utilizing a prediction algorithm a time instant when a peak value of the current signal substantially equals the programmable reference current signal; and (c) generate the control signal based on the mathematically computed time instant,
wherein the time instant when the current signal substantially equals the programmable reference current signal is mathematically computed by:

$$\Delta t = \frac{\Delta I[n]}{(m_1 + m_2)}$$

where $\Delta I[n] = I_{ref}(n) - i_L(n)$
$I_{ref}$=programmable current reference signal
$i_L$=inductor current signal
$m_1$ is the slope of the slope compensation ramp
$m_2$ is the slope of inductor current signal.

* * * * *